United States Patent [19]
Tsurugai et al.

[11] Patent Number: 5,747,549
[45] Date of Patent: May 5, 1998

[54] FOAMED PARTICLES OF POLYPROPYLENE HOMOPOLYMER AND MOLDED ARTICLE OF THE FOAMED PARTICLES

[75] Inventors: Kazuo Tsurugai; Hisao Tokoro, both of Utsunomiya; Masaharu Oikawa, Mibu-machi, all of Japan

[73] Assignee: JSP Corporation, Tokyo, Japan

[21] Appl. No.: 750,248

[22] PCT Filed: Apr. 5, 1996

[86] PCT No.: PCT/JP96/00943

§ 371 Date: Dec. 5, 1996

§ 102(e) Date: Dec. 5, 1996

[87] PCT Pub. No.: WO96/31558

PCT Pub. Date: Oct. 10, 1996

[30] Foreign Application Priority Data

Apr. 5, 1995 [JP] Japan .................................. 7-104701

[51] Int. Cl.$^6$ ........................................................ C08J 9/22
[52] U.S. Cl. ............................ 521/60; 521/56; 521/142; 521/143
[58] Field of Search ........................... 521/56, 60, 142, 521/143

[56] References Cited

U.S. PATENT DOCUMENTS 4,587,270  5/1986  Kuwabara et al. ........................ 54/58

*Primary Examiner*—Morton Foelak
*Attorney, Agent, or Firm*—Sherman and Shalloway

[57] ABSTRACT

The molded articles of foamed particles, which are produced by using foamed particles composed of a polypropylene-based polymer, have had excellent cushioning characteristics and impact resilience, but have been not always satisfactory in stiffness such as compressive strength.

The invention is directed to foamed particles comprising a polypropylene homopolymer as a base resin and having a tensile modulus of 15,000–25,000 kg/cm$^2$ and a crystal structure that an inherent peak and a high-temperature peak appear as endothermic peaks on a DSC curve obtained by differential scanning calorimetry of the foamed particles. A quantity of heat at the high-temperature peak is 30–60 J/g.

A molded article of foamed particles according to the invention is obtained by using the foamed particles as described above and molding them, and has a density of 0.01–0.3 g/cm$^3$ and a tensile modulus of 15,000–25,000 kg/cm$^2$. It has a crystal structure that an inherent peak and a high-temperature peak appear on a DSC curve obtained by its differential scanning calorimetry like the case of the foamed particles. As with the foamed particles, a quantity of heat at the high-temperature peak is 30–60 J/g.

8 Claims, 4 Drawing Sheets

FIG. 4

FOAMED PARTICLES OF POLYPROPYLENE HOMOPOLYMER AND MOLDED ARTICLE OF THE FOAMED PARTICLES

TECHNICAL FIELD

The present invention relates to foamed particles of a polypropylene homopolymer and a molded article of foamed particles obtained by molding the foamed particles of the polypropylene homopolymer.

BACKGROUND ART

It is known to obtain a molded article of foamed particles by filling foamed particles composed of a polypropylene-based polymer into a mold which can be closed but cannot be hermetically sealed, and heating the foamed particles, whereby the foamed particles are secondarily foamed and mutually fusion-bonded. For example, Japanese Patent Publication No. 43491/1984, and Japanese Patent Application Laid-Open Nos. 242638/1989, 50945/1990, 253741/1992 and 9327/1993 disclose techniques for producing a molded article of foamed particles by such a process.

The molded articles of foamed particles, which are obtained by using the foamed particles composed of a polypropylene-based polymer and molding them, have had such properties that cushioning characteristics and impact resilience are excellent, their weights are light and residual strain is also small. However, their stiffness such as compressive strength has not been always satisfactory.

More specifically, in the molded articles of the foamed particles of the polypropylene-based polymer, an ethylene-propylene random copolymer, ethylene-propylene block copolymer, 1-butene-propylene random copolymer, 1-butene-propylene block copolymer, ethylene-1-butene-propylene random copolymer or the like is mainly used as a base resin from the standpoint of foamability and the like. However, these polymers themselves have low stiffness by nature. Therefore, various attempts have been made for the purpose of improving the stiffness of the resulting molded article, for example, by making the content of a comonomer in the copolymer lower or mixing linear polyethylene with an α-olefin-propylene copolymer. The improvement in the stiffness of the molded articles has been limited.

On the other hand, polypropylene itself is a polymer high in stiffness. It is thus expectable to obtain a molded article of foamed particles, which has high stiffness, when molding is conducted by using foamed particles composed of a polypropylene homopolymer. However, the attempt to obtain a molded article from the foamed particles composed of the polypropylene homopolymer causes problems that the range of molding temperatures necessary for successfully conducting expansion is very limited, extreme difficulty is encountered on the control of expanding temperature, and the resulting molded article is accompanied by disadvantages that a failure in fusion bonding is caused, and the appearance of the surface of the molded article becomes poor. Any production technique suitable for industrial production has not been yet established. Of course, such problems arise even in the production of foamed particles. Namely, when foamed particles are produced by using a polypropylene homopolymer as a base resin, the range of foaming temperatures necessary for successfully conducting foaming has been limited, resulting in difficulty in realizing industrial production.

As described above, any foamed particles obtained by using a polypropylene homopolymer as a base resin and any molded articles produced by using such foamed particles have not been yet marketed. The attempt to use the polypropylene-based copolymer containing various kinds of comonomers as a base resin to enhance the stiffness of the resulting molded article while retaining good moldability as described above is only being made.

It is an object of the present invention to provide foamed particles comprising a polypropylene homopolymer as a base resin. Another object of the present invention is to provide foamed particles of a polypropylene homopolymer, which have good moldability.

A further object of the present invention is to provide a molded article produced by using such foamed particles of the polypropylene homopolymer. A still further object of the present invention is to provide a molded article of foamed particles composed of a polypropylene homopolymer, which has high stiffness and excellent mechanical strength.

DISCLOSURE OF THE INVENTION

The present invention is directed to foamed particles comprising a polypropylene homopolymer as a base resin and having a tensile modulus of 15,000–25,000 kg/cm$^2$ and a crystal structure that an inherent peak and a high-temperature peak appear as endothermic peaks on a DSC curve obtained by differential scanning calorimetry of the foamed particles. The term "high-temperature peak" means a peak which appears on the temperature side higher than a temperature corresponding to the inherent peak of endothermic peaks appearing on the DSC curve obtained by heating 2–4 mg of the foamed particles to 220° C. at a heating rate of 10° C./min by a differential scanning calorimeter.

The development of the high-temperature peak is made possible by adjusting the heating and holding time and temperature of polymer particles prior to foaming to specific ranges upon the production of the foamed particles. In this case, the quantity of heat at the high-temperature peak is determined by the adjustment of the heating and holding time and temperature. In fact, the quantity of heat at the high-temperature peak is affected by the foaming temperature and shows a tendency to decrease when the foaming temperature is high.

The foamed particles according to the present invention have a quantity of heat at the high-temperature peak of 30–60 J/g.

The molded article of the foamed particles according to the present invention is produced by using the foamed particles as described above. Development of a high-temperature peak and disappearance of the high-temperature peak do not occur upon the production of this molded article. A high-temperature peak having the same quantity of heat at the high-temperature peak as that of the foamed particles develops even in the molded article produced. Namely, the same high-temperature peak as that in the foamed particles appears on a DSC curve obtained by the differential scanning calorimetry of the molded article of the foamed particles according to the present invention, and the quantity of heat at the high-temperature peak is 30–60 J/g like the foamed particles.

The molded article of the foamed particles according to the present invention has a density of 0.01–0.3 g/cm$^3$.

Although the foamed particles according to the present invention comprise a polypropylene homopolymer as a base resin, they are excellent in moldability and permit easy production of a molded article having a high expansion ratio and great stiffness.

The use of the foamed particles according to the present invention in the production of a molded article has an advantage that a range of molding temperatures necessary for successfully conducting molding is wide, so that the temperature in production is easy to control. Accordingly, the use of the foamed particles according to the present invention permits the production of molded articles of the foamed particles comprising a polypropylene homopolymer as a base resin on an industrial scale.

The molded article of the foamed particles according to the present invention has excellent stiffness, in particular, high compressive strength. Accordingly, it is excellent in energy-absorbing ability upon its application to a cushioning material compared with the conventional molded articles of foamed particles and hence has an advantage that the molded article according to the present invention absorbs greater energy than the conventional one, for example, even when their expansion ratios are the same.

BEST MODE FOR CARRYING OUT THE INVENTION

The present invention is directed to foamed particles comprising a polypropylene homopolymer as a base resin and having a tensile modulus of 15,000–25,000 kg/cm$^2$ and a crystal structure that an inherent peak and a high-temperature peak appear as endothermic peaks on a DSC curve obtained by differential scanning calorimetry of the foamed particles. The term "high-temperature peak" means a peak which appears on the temperature side higher than a temperature corresponding to the inherent peak of endothermic peaks appearing on the DSC curve obtained by heating 2–4 mg of the foamed particles to 220° C. at a heating rate of 10° C./min by a differential scanning calorimeter. In the present invention, a quantity of heat at the high-temperature peak is 30–60 J/g.

The foamed particles of the polypropylene homopolymer according to the present invention have a tensile modulus of 15,000–25,000 kg/cm$^2$, preferably 15,500–20,000 kg/cm$^2$. If the tensile modulus of the foamed particles is lower than 15,000 kg/cm$^2$, the resulting molded article of the foamed particles becomes low in stiffness. If the tensile modulus exceeds 25,000 kg/cm$^2$ on the other hand, a range of expanding temperatures in expansion and a range of molding temperatures in molding are very limited. In both cases, no satisfactory molded article can be obtained from such foamed particles.

The tensile modulus of the foamed particles is determined mainly by the tensile modulus of a base resin thereof. When a base resin having a tensile modulus of 15,000–25,000 kg/cm$^2$ (preferably 15,500–20,000 kg/cm$^2$) is used in the provision of the foamed particles, the tensile modulus of the resulting foamed particles generally falls within the above range.

Besides, the tensile modulus of the foamed particles is in approximately proportional relation to the compressive strength of a molded article of the foamed particles obtained by molding the foamed particles. The use of the foamed particles high in tensile modulus permits the provision of a molded article of the foamed particles high in compressive strength.

A copolymer of polypropylene and an α-olefin, which has heretofore been used as a base resin, has a tensile modulus of about 8,000–12,000 kg/cm$^2$. The tensile modulus of 8,000–12,000 kg/cm$^2$ is insufficient from the viewpoint of conditions for obtaining a molded article of foamed particles having high stiffness.

In the present invention, the term "DSC curve obtained by differential scanning calorimetry of the foamed particles" means a DSC curve obtained by using the foamed particle of the polypropylene homopolymer and heating 2–4 mg of the foamed particles to 220° C. at a heating rate of 10° C./min by a differential scanning calorimeter.

Figure 1:
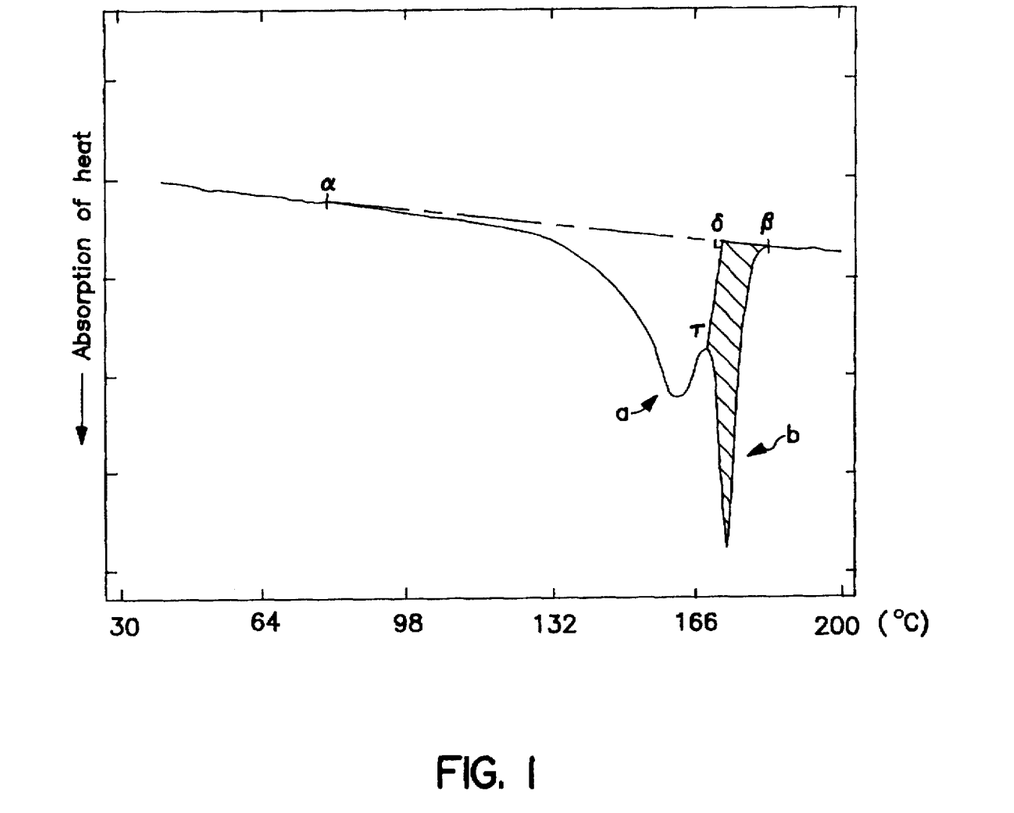
FIG. 1 shows an illustrative chart of a first DSC curve of foamed particles.
Figure 2:
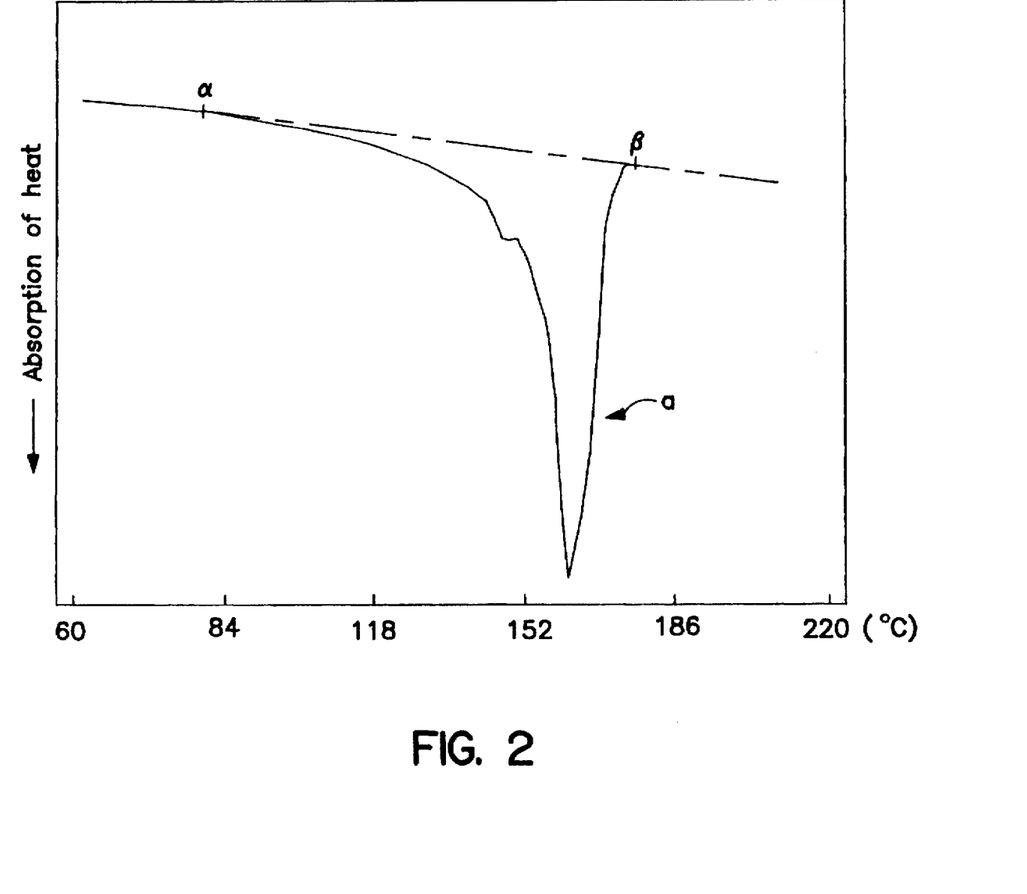
FIG. 2 shows an illustrative chart of a second DSC curve of the foamed particles.

Here, a DSC curve obtained by heating a sample from room temperature to 220° C. at a heating rate of 10° C./min is referred to as a first DSC curve (an example thereof is illustrated in FIG. 1). A DSC curve obtained by cooling the thus-heated sample from 220° C. to about 40° C. at a cooling rate of 10° C./min and heating it again to 220° C. at a heating rate of 10° C./min is referred to as a second DSC curve (an example thereof is illustrated in FIG. 2). Endothermic peaks a and b appear on the first DSC curve as illustrated in FIG. 1. Of these peaks, the endothermic peak b which appears on the temperature side higher than a temperature corresponding to the endothermic peak a appears only on the first DSC curve and does not appear on the second DSC curve.

The endothermic peak a which appears not only on the first DSC curve but also on the second DSC curve is due to inherent absorption of heat upon so-called melting of the polypropylene homopolymer, which is a base resin for the foamed particles, and is an endothermic peak inherent in this polymer. The endothermic peaks a and b will hereinafter be referred to as "inherent peak" and "high-temperature peak", respectively. The high-temperature peak b which appears only on the first DSC curve is attributed to the existence of a crystal structure different from the crystal structure of foamed particles of a polypropylene homopolymer, which do not show any high-temperature peak.

More specifically, the inherent peak a appears not only on the first DSC curve but also on the second DSC curve, while the high-temperature peak b appears only on the first DSC curve but does not appear on the second DSC curve obtained by heating under the same conditions. Accordingly, the crystal structure of the foamed particles, in which the high-temperature peak b appears together with the inherent peak a, seems not to be attributed to the crystal structure of the base resin itself constituting the foamed particles, but to be attributed to the crystal structure that the foamed particles of the polypropylene homopolymer have in the form of foamed particles. Therefore, foamed particles of a polypropylene homopolymer, which have a crystal structure that a high-temperature peak b appears on a DSC curve of the foamed particles, can be obtained by producing foamed particles under specific foaming conditions that the heating and holding time and temperature of polymer particles prior to foaming are specified, and a foaming temperature is specified. Foamed particles of a polypropylene homopolymer, in which such a high-temperature peak b does not appear on their DSC curve, tend to form open cells in the foamed particles, have poor moldability and are hence difficult to provide any molded article of good quality.

Incidentally, it is desirable that a greater difference exists between the temperature corresponding to the top of the high-temperature peak b appearing on the first DSC curve and the temperature corresponding to the top of the inherent peak a appearing on the second DSC curve. The difference between both temperatures is at least 5° C., preferably at least 10° C. Incidentally, two endothermic peaks are each drawn by a smooth curve in FIG. 1. However, the DSC curve does not always become such a smooth curve. The overlaps of plural endothermic peaks may appear on the chart, and two endothermic peaks of the inherent peak and the high-temperature peak may appear on the chart as a whole in some cases.

The high-temperature peak b is ascertained by the comparison of the first DSC curve with the second DSC curve. Here, the quantity of heat at the high-temperature peak b is determined by the following procedure. As shown in FIG. 1, a straight line is first drawn between a point α at 80° C. on the DSC curve and a point β on the DSC curve, which indicates the melting completion temperature of the base resin. A perpendicular line is then drawn from a point γ on the DSC curve, which corresponds to a valley between the inherent peak a and the high-temperature peak b, to the straight line connecting the point α and the point β. The intersection thereof is regarded as a point δ. The quantity of heat at the high temperature peak b is found as a quantity of heat corresponding to a section (an area hatched in FIG. 1) surrounded by a straight line connecting the point δ thus obtained and the point β, a straight line connecting the point γ and the point δ and a DSC curve connecting the point γ and the point β. In the foamed particles of the polypropylene homopolymer according to the present invention, the quantity of heat at the high-temperature peak b (hereinafter referred to as "quantity of heat at the high-temperature peak) is 30–60 J/g, preferably 30–50 J/g. According to the present invention, the tensile modulus and the quantity of heat at the high-temperature peak of the foamed particles are adjusted to 15,000–25,000 kg/cm² and 30–60 J/g, respectively, whereby a molded article high in stiffness can be produced, and moreover a range of molding temperatures necessary for producing molded articles of good quality can be widened.

Any quantity of heat at the high-temperature peak exceeding 60 J/g is accompanied by disadvantages that the secondary foamability of the foamed particles is deteriorated, many voids are observed in the surface of a molded article obtained by molding such foamed particles to give a poor appearance, and a problem of a failure in fusion bonding among the foamed particles is also caused, so that the stiffness of the resulting molded article becomes poor when the fusion bonding among the foamed particles is particularly insufficient.

Figure 4:
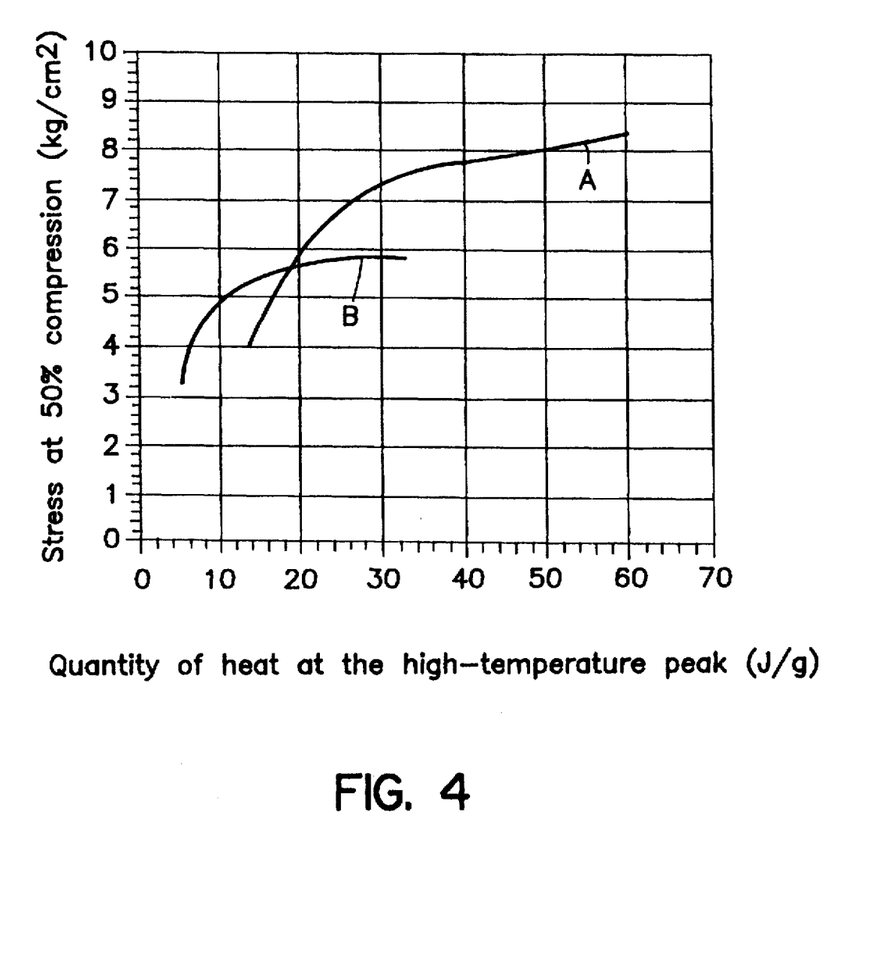
FIG. 4 is a graph illustrating a relationship between the quantity of heat at the high-temperature peak of foamed particles and the stress at 50% compression of a molded article molded by using such foamed particles.

If the quantity of heat at the high-temperature peak is less than 30 J/g on the other hand, the stiffness inherent in the base resin cannot be brought out, so that the stiffness of a molded article obtained by molding such foamed particles becomes insufficient. It has been elucidated by extensive research by the present inventors that the quantity of heat at the high-temperature peak not only affects the moldability and the like of the foamed particles but also has a great influence on the stiffness of a molded article of foamed particles obtained by molding such foamed particles. More specifically, as apparent from a curve A in FIG. 4 which is an illustrative graph showing a relationship between the quantity of heat at the high-temperature peak of the foamed particles and the stress at 50% compression of a molded article molded by using such foamed particles, the compressive strength of the resulting molded article is markedly lowered if the quantity of heat at the high-temperature peak is lower than 30 J/g, resulting in a failure to bring out the stiffness inherent in the base resin.

Here, the curve A indicates a molded article of foamed particles, which has a density of 0.060 g/cm³ and is obtained by molding foamed particles comprising, as a base resin, a polypropylene homopolymer having a tensile modulus of 18,500 kg/cm² and a melting point $T_m$ of 162.8° C. On the other hand, a curve B in FIG. 4 denotes a molded article of foamed particles, which has a density of 0.060 g/cm³ and is obtained by molding foamed particles comprising, as a base resin, a propylene-ethylene random copolymer (ethylene content: 2.4 wt. %) having a tensile modulus of 12,000 kg/cm² and a melting point $T_m$ of 146.0° C. As shown by the curve B, the molded article composed of the propylene-based copolymer as a base resin does not have a point of inflection as to compressive stress at 30 J/g. Therefore, the above-described properties are characteristic of the foamed particles of the polypropylene homopolymer.

In the present invention, any quantity of heat at the high-temperature peak lower than 30 J/g results in a failure to attain sufficient stiffness if a molded article having good appearance can be obtained.

If the high-temperature peak is 30 J/g or higher, the stiffness inherent in the base resin can be brought out, and moreover the compressive strength of the resulting molded article can be easily specified and controlled because a change in compressive stress is small.

The value of the quantity of heat at the high-temperature peak can be adjusted by controlling a heating rate to a foaming temperature and the foaming temperature, or holding foamed particles once for a sufficient period of time (preferably 15–60 minutes) at a temperature not lower than (the melting point $T_m$ of the base resin $-15°$ C.) but lower than a melting completion temperature $T_e$. The heating and holding temperature and time and the foaming temperature form an important factor of the quantity of heat at the high-temperature peak. However, the quantity of heat at the high-temperature peak is finally affected by the foaming temperature.

In the present invention, the total quantity of heat at endothermic peaks on a DSC curve obtained by differential scanning calorimetry of a base resin composed of a polypropylene homopolymer used in the present invention is preferably 120 J/g or less, more preferably 115 J/g or less.

The quantity of heat at the high-temperature peak of the resulting foamed particles is decreased as the foaming temperature at the time the foaming particles are obtained is raised. If the total quantity of heat of the base resin exceeds 120 J/g, a variation ΔE of the quantity of heat at the high-temperature peak of the resulting foamed particles exceeds 15 J/g.°C. when the foaming temperature is changed by 1° C. Such a variation ΔE is too great. On the other hand, when the total quantity of heat of the base resin is not greater than 120 J/g, the variation ΔE is not greater than 15 J/g.°C. (ΔE is not greater than 10 J/g.°C. in the case of 115 J/g or less). When the total quantity of heat at the endothermic peaks on the DSC curve of the base resin is 120 J/g or less, the dependence of the quantity of heat at the high-temperature peak of the resulting foamed particles on temperature becomes small.

When the dependence of the quantity of heat at the high-temperature peak on temperature is small, the following actions and effects are brought about.

(1) If a foaming temperature is somewhat changed, the expansion ratio of the resulting foamed particles is not greatly varied, so that good foamed particles having an even expansion ratio can be obtained.

(2) If the foaming temperature is raised for the purpose of obtaining foamed particles having a still higher expansion ratio, the quantity of heat at the high-temperature peak is not markedly reduced. Therefore, when the resulting foamed particles having a high expansion ratio are filled into a mold to heat and mold them, a good-quality molded article of the foamed particles can be obtained without any possibility of the molded article shrinking, and the secondary foamability of the foamed particles is extremely easy to control in molding making use of them.

The reason why the dependence of the quantity of heat at the high-temperature peak on temperature in the foamed particles is lowered by controlling the total quantity of heat at the endothermic peaks of the base resin to 120 J/g or less is not fully clarified. However, the reason is considered to be as follows. Namely, the total quantity of heat is relevant to the crystallinity of the base resin. Any base resin having a total quantity of heat of 120 J/g or less is said to be lower in crystallizability among base resins. When the high-temperature peak in such a base resin is grown, a secondary crystal nucleus generated on the crystal plane of a primary crystal after formation of such a primary crystal forms a thicker lamella structure. Therefore, a secondary crystal difficult to melt is grown, so that the variation ΔE of the quantity of heat at the high-temperature peak according to the change of foaming temperature becomes small.

The total quantity of heat at the endothermic peaks of the base resin can be determined by the following method.

Figure 3:
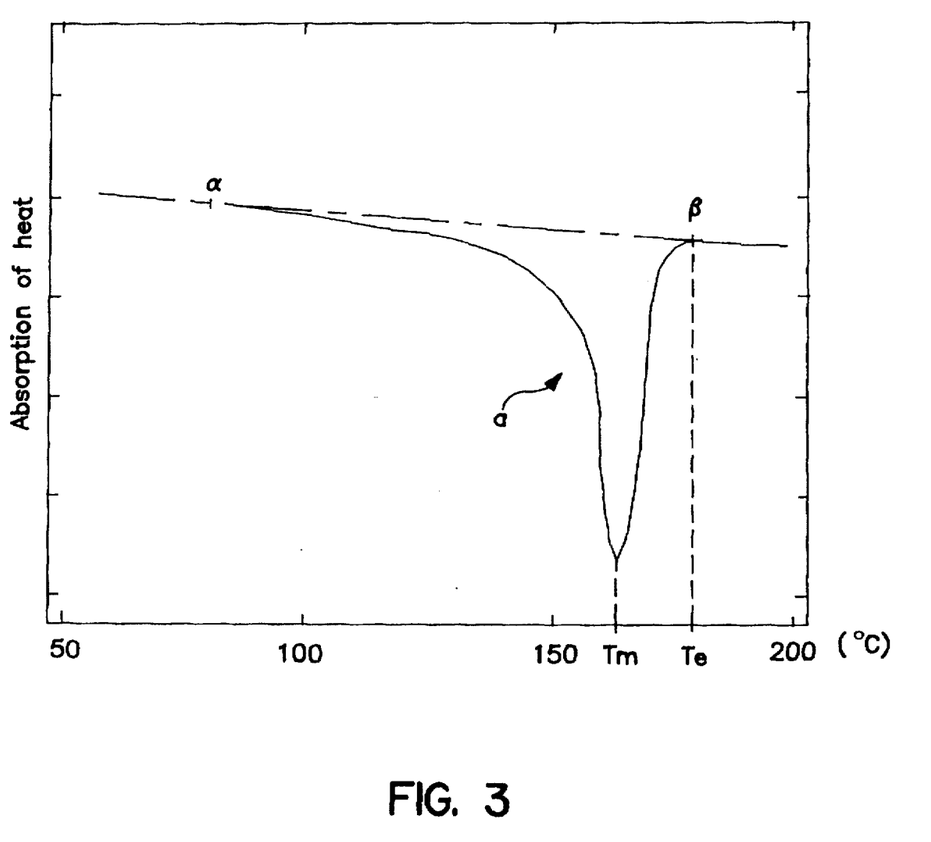
FIG. 3 shows an illustrative chart of a second DSC curve of a base resin.

First of all, 2–4 mg of the base resin composed of a polypropylene homopolymer are used as a sample, heated to 220° C. at a heating rate of 10° C./min, cooled from 220° C. to about 40° C. at a cooling rate of 10° C./min and then heated again to 220° C. at a heating rate of 10° C./min, thereby obtaining a DSC curve. Namely, the differential scanning calorimetry of the base resin is conducted in the same manner as in the case where the second DSC curve as to the foamed particles of the polypropylene homopolymer is obtained as described above, thereby obtaining the DSC curve. On the basis of this DSC curve, as illustrated in FIG. 3, a straight line is drawn between a point α at 80° C. on the DSC curve and a point β on the DSC curve, which indicates the melting completion temperature $T_e$ of the base resin. A quantity of heat of a section surrounded by this straight line and the DSC curve is found, which the quantity of heat corresponds to the total quantity of heat at the endothermic peaks of the base resin. A total quantity of heat of the endothermic peaks of the foamed particles can be found on the basis of the second DSC curve as to the foamed particles in the same manner as described above. This total quantity of heat of the endothermic peaks of the foamed particles shows substantially the same value as that of the total quantity of heat at the endothermic peaks of the base resin.

Further, the base resin composed of the polypropylene homopolymer preferably has a melt flow index (hereinafter abbreviated as "MI") of 5–12 g/10 min as determined in accordance with JIS K 7210, Test Condition 14 because foamed particles having a higher expansion ratio can be obtained. If MI is lower than 5 g/10 min, any effect for enhancing the expansion ratio of the resulting foamed particles cannot be expected. On the other hand, any MI higher than 12 g/10 min has a possibility that the resulting foamed particles may have open cells. It is hence not preferable to use any base resin having an MI outside the above range.

An illustrative production process of the foamed particles according to the present invention is as follows.

First, pellet-like resin particles are produced by, for example, a means in which the base resin is melted and kneaded in an extruder, and then extruded into a strand, and the strand thus obtained is either cooled and then chopped into proper lengths or chopped into proper lengths and then cooled. The thus-obtained resin particles are then dispersed in a dispersion medium in a closed vessel, and a dispersant is added as needed. The resultant dispersion is then heated to a temperature not lower than a softening temperature of the resin particles in the presence of a blowing agent, thereby impregnating the resin particles with the blowing agent. Thereafter, the vessel is opened at one end thereof so as to release the resin particles and the dispersion medium at the same time into an atmosphere of a pressure lower than the internal pressure of the vessel (usually, under atmospheric pressure) while maintaining the internal pressure of the vessel higher than the vapor pressure of the blowing agent, whereby the resin particles are expanded to obtain foamed particles. In this case, when the resin particles are heated in the closed vessel, the heating temperature is raised to a temperature not lower than (the melting point $T_m$ of the base resin −15° C.) but lower than a melting completion temperature $T_e$ of the resin particles without raising the temperature beyond the melting completion temperature $T_e$, and the resin particles are held for 5–60 minutes at the same temperature, whereby foamed particles having a crystal structure that a high-temperature peak b appears on a DSC curve thereof can be obtained. The foaming temperature is within a range of from (the melting point $T_m$−15° C.) to (the melting completion temperature $T_e$+5° C.).

The melting point $T_m$ means a temperature corresponding to the top of the inherent peak a which appears on the above-described DSC curve (FIG. 3) as to the base resin, while the melting completion temperature $T_e$ denotes a temperature corresponding to a foot of the inherent peak a on the higher temperature side, where the curve returns to the baseline.

In the present invention, the polypropylene homopolymer is used as a base resin. However, various additives, and other resins or elastomers may be mixed with the base resin within limits not impeding the effects of the present invention.

Examples of the additives which can be mixed with the base resin include antioxidants, ultraviolet-light absorbents, antistatic agents, flame retarders, metal deactivators, pigments, dyes, inorganic substances and nucleating agents. The amount of these additives to be added may vary according to the physical properties required of the resulting molded article of foamed particles. However, they are mixed in a proportion of 20 parts by weight or lower, preferably 5 parts by weight or lower per 100 parts by weight of the base resin. Incidentally, examples of the inorganic substances to be mixed with the base resin include talc, calcium carbonate, borax and aluminum hydroxide.

As examples of the resins which can be mixed with the base resin, may be mentioned thermoplastic resins, such as polyolefin resins such as polypropylene-based resins having a tensile modulus lower than 15,000 kg/cm², high-density polyethylene, linear low-density polyethylene, ultra-low-density polyethylene, low-density polyethylene, ethylene-vinyl acetate copolymers, ethylene-acrylic ester copolymers, ethylene-acrylic acid copolymers and ethylene-methacrylic acid copolymers; and polystyrene resins. The amount of these resins to be mixed is less than 50 parts by weight per 100 parts by weight of the base resin. Any amount may be selected from the above range of mixing amounts so far as the tensile modulus of the resulting foamed particles is retained within the above-described range, and the heating and molding of the foamed particles are not adversely affected.

Examples of the elastomers which can be used include solid rubbers such as ethylene-propylene rubber, ethylene-1-butene rubber, propylene-1-butene rubber, styrene-butadiene rubber and hydrogenated products thereof, isoprene rubber, neoprene rubber, and nitrile rubber; polystyrene elastomers such as styrene-butadiene block copolymer elastomers and hydrogenated products thereof; and other various elastomers.

The mixing of such components as described above into the polypropylene homopolymer is conducted by wet mixing or dry mixing. In general, they may be mixed by melting and kneading. It is only necessary to knead them at a desired temperature by one of various kneading machines such as, for example, roll, screw and Banbury mixers, kneaders, blenders, and mills.

Examples of the blowing agent used upon the production of the foamed particles generally include volatile blowing agents, such as aliphatic hydrocarbons such as propane, butane, pentane, hexane and heptane, alicyclic hydrocarbons such as cyclobutane and cyclopentane, and halogenated hydrocarbons such as trichlorofluoromethane, dichlorodifluoromethane, dichlorotetrafluoroethane, methyl chloride, ethyl chloride and methylene chloride; inorganic gas blowing agents such as nitrogen, carbon dioxide, argon and air; and mixtures thereof. Of these, inorganic gas blowing agents which causes no ozonosphere destruction and is cheap are preferable, with nitrogen, air and carbon dioxide being particularly preferred.

Here, the amount of the blowing agents other than nitrogen and air to be used is generally 2–50 parts by weight per 100 parts by weight of the resin particles. On the other hand, when nitrogen or air is used as a blowing agent, it is introduced into a closed vessel under a pressure within a range of 20–60 kg/cm²·G. The amount of these blowing agents to be used is suitably selected according to the relationship between the expansion ratio of the foamed particles to be obtained and a foaming temperature or the quantity of heat at the high-temperature peak.

No limitation is imposed on the dispersion medium used in dispersing the resin particles therein so far as it does not dissolve the resin particles. Examples thereof include water, ethylene glycol, glycerol, methanol and ethanol. Water is generally used.

As the dispersant to be added as needed upon dispersing the resin particles in the dispersion medium, there may be used finely particulate aluminum oxide, titanium oxide, basic magnesium carbonate, basic zinc carbonate, calcium carbonate, kaolin, talc, mica or clay, or the like. Such a dispersant is generally added in a proportion of 0.2–2 parts by weight per 100 parts by weight of the base resin.

The foamed particles obtained in the above-described manner are then subjected to a pretreatment such as the application of an internal pressure as needed, and the thus-treated foamed particles are filled into a mold which can be closed but cannot be hermetically sealed, and heated with 3.0–7.0 kg/cm²·G of steam, whereby the foamed particles are mutually fusion-bonded and secondarily expanded. Thereafter, the foamed particles thus fusion-bonded are cooled, whereby a molded article of the foamed particles composed of the polypropylene homopolymer, which has excellent stiffness, can be obtained.

The molded article of the foamed particles of the polypropylene homopolymer according to the present invention has a density of 0.01–0.3 g/cm³. In order to enhance the compressive strength of the molded article, the density is preferably 0.03–0.3 g/cm³. Further, the density is preferably 0.045–0.2 g/cm³ in view of the brittleness by bending at low temperature, compression set, the kind of the blowing agent, and the easy provision of a molded article having a stress at 50% compression of at least 7 kg/cm².

The density of the molded article of the foamed particles is determined by finding a volume V (cm³) of the molded article of the foamed particles from the outside dimension thereof and dividing the weight W (g) of the molded article by this volume V (cm³).

The molded article of the foamed particles according to the present invention has a tensile modulus of 15,000–25,000 kg/cm², preferably 15,500–20,000 kg/cm². This tensile modulus is the same numerical value as that of the foamed particles according to the present invention. If the tensile modulus of the molded article is lower than 15,000 kg/cm², the stiffness of the molded article becomes low. If the tensile modulus exceeds 25,000 kg/cm² on the other hand, a range of molding temperatures in its molding is limited, resulting in a molded article poor in appearance or the like. Therefore, any tensile modulus outside the above range is not preferable. In each case, it is difficult to obtain a molded article itself.

In the molded article according to the present invention, the same high-temperature peak as in the foamed particles appears on a DSC curve obtained by differential scanning calorimetry of the molded article. In the differential scanning calorimetry of the molded article, a small piece cut out of the molded article is used as a sample. An inherent peak and a high-temperature peak situated on the temperature side higher than a temperature corresponding to the inherent peak appear as two endothermic peaks on a DSC curve obtained by using 2–4 mg of the small piece of the molded article as a sample, and heating this sample to 220° C. at a heating rate of 10° C./min by means of a differential scanning calorimeter.

The DSC curve obtained by heating the sample from room temperature to 220° C. at a heating rate of 10° C./min is referred to as a first DSC curve. A DSC curve obtained by cooling the thus-heated sample from 220° C. to about 40° C. at a cooling rate of 10° C./min and heating it again to 220° C. at a heating rate of 10° C./min is referred to as a second DSC curve. In this case, the high-temperature peak appears only on the first DSC curve and does not appear on the second DSC curve. The first and second DSC curves are obtained as DSC curves similar to the first DSC curve as to the foamed particles as illustrated in FIG. 1 and the second DSC curve as to the foamed particles as illustrated in FIG. 2, respectively.

The quantity of heat at the high-temperature peak in the molded article according to the present invention is 30–60 J/g, preferably 30–50 J/g. The numerical value of this quantity of heat at the high-temperature peak is also the same as the quantity of heat at the high-temperature peak in the foamed particles according to the present invention. A manner of determining the quantity of heat at the high-temperature peak in the molded article according to the present invention is the same as the manner of determining the quantity of heat at the high-temperature peak in the foamed particles according to the present invention.

In the molded article of the foamed particles according to the present invention, it is preferable from the viewpoint of heat resistance that the shrinkage factor of the molded article be 1.0% or lower as determined by measurement of dimensional change under heat under conditions of 120° C. in accordance with JIS K 6767. By controlling the shrinkage factor to 1.0% or lower, it is possible to bring about characteristic actions and effects that suitability for foam can be improved, and moreover high-heat resistance can also be enhanced, which have been unable to be realized by the conventional molded articles.

The molded article according to the present invention can be suitably used in application fields such as energy absorbers, core materials for automobile bumpers, vehicle door pads, packing materials for heavy cargoes, high-strength containers, heat- or cold-insulating boxes, tool boxes, and returnable cases for parts and the like making best use of its characteristics that it is high in stiffness and light in weight.

The molded article of the foamed particles according to the present invention has high stiffness and hence can retain sufficient stiffness even when its expansion ratio is raised to make its weight lighter than the conventional product, or its thickness is made thinner than the conventional product.

The present invention will hereinafter be described in more detail by Examples (Examples 1–6) and Comparative Examples (Comparative Examples 1–6).

Various base resins having their corresponding tensile moduli ($kg/cm^2$), melting points, total quantities of heat (J/g) at endothermic peaks on their DSC curves and MIs (g/10 min) shown in Table 1 were separately melted and kneaded in an extruder, and each of the thus-melted mixtures was extruded into a strand through a die. The strand was quenched in water and then chopped into predetermined lengths, thereby forming pellets. A dispersion obtained by using 10–80 g of dry ice as a blowing agent and adding 4 g of kaolin and 0.08 g of sodium dodecylbenzenesulfonate as dispersants to disperse 1,000 g of the above-obtained pellets in 3,000 cc of water was heated to its corresponding heating and holding temperature shown in Table 1 with stirring in a closed vessel (volume: 5 liters) without raising the temperature of the dispersion beyond a melting completion temperature $T_e$ of the base resin and held for 15 minutes at the same temperature and further heated to its corresponding foaming temperature shown in Table 1 without raising the temperature of the dispersion beyond the melting completion temperature $T_e$ of the base resin and held for 15 minutes at the same temperature. Thereafter, a back pressure of (the equilibrium vapor pressure of the blowing agent +5 $kg/cm^2G$) was applied by nitrogen to the closed vessel, and the vessel was opened at one end thereof while maintaining such a pressure to release the resin particles and water at the same time, whereby the resin particles were expanded to obtain foamed particles.

Each of the thus-obtained foamed particle samples was defoamed by a hot press to measure its tensile modulus. Besides, its quantity of heat at the high-temperature peak was determined from a DSC curve obtained by using a differential scanning calorimeter (DSC-50, manufactured by Shimadzu Corporation) and heating about 2 mg of the foamed particle sample to 220° C. at a heating rate of 10° C./min under a nitrogen gas atmosphere at a feed rate of nitrogen gas of 20 ml/min. Further, a variation ΔE of the quantity of heat at the high-temperature peak according to the change of the foaming temperature in each of the foamed particle samples was determined to investigate the dependence of the quantity of heat at the high-temperature peak on temperature. These results are shown in Table 2.

The measuring method of the tensile modulus and the manner of determining the variation ΔE of the quantity of heat at the high-temperature peak are as follows.

[Measuring Method of Tensile Modulus of Base Resin]

Pellets of a base resin are heated and pressed by a hot press at 220° C. to produce a sheet having a thickness of 1 mm. The measurement is conducted as to the thus-obtained sheet under the following conditions in accordance with JIS K 7113.

Test piece: JIS No. 2 Type
Thickness of test piece: 1±0.1 mm
Testing rate: 50 mm/min
Distance between chucks: 80 mm

[Measuring Method of Tensile Modulus of Foamed Particles]

Foamed particles are heated and pressed for 10 minutes by a hot press at 220° C. to melt and defoam the foamed particles, thereby producing a sheet having a thickness of 1 mm.

The same procedure as the Measuring Method of Tensile Modulus of Base Resin in accordance with JIS K 7113 shall apply hereinafter to the measurement.

[Manner of Determining Variation ΔE of Quantity of Heat at High-Temperature Peak]

With respect to the individual base resins, conditions other than a foaming temperature are fixed. A closed vessel (volume: 5 liters) was charged with 1,000 g of resin particles, 3,000 g of water, 50 g of carbon dioxide, 4 g of kaolin and 0.08 g of sodium dodecylbenzenesulfonate. The contents were heated from room temperature to (a foaming temperature −5° C.) at a heating rate of 2° C./min and held for 15 minutes at the same temperature and then heated to the foaming temperature at a heating rate of 1° C./min and held for 15 minutes at the same temperature. Thereafter, the predetermined back pressure (45 $kg/cm^2$·G) was applied by nitrogen gas to the closed vessel, and the vessel was opened at one end thereof while maintaining such a pressure to release the resin particles and water at the same time, thereby obtaining foamed particles. In this case, the foaming temperature was changed at least three times to obtain respective foamed particle samples. Quantities of heat at the high-temperature peak of the foamed particles samples thus obtained were then measured to determine a variation ΔE of the quantity of heat at the high-temperature peak from a curve or straight line obtained by plotting the foaming temperature as an abscissa axis and the quantity of heat at the high-temperature peak as an ordinate axis in accordance with the following equation: ΔE=(50 [J/g]−30 [J/g])/{ (Foaming temperature [°C.] at which the quantity of heat at the high-temperature peak is 30 J/g)−(Foaming temperature [°C.] at which the quantity of heat at the high-temperature peak is 50 J/g)}, with the proviso that values as to a foamed particle sample by which a molded article good in fusion-bonding property and appearance can be obtained by heating and molding in a mold using 4.0–6.0 $kg/cm^2$·G of steam are used as the foaming temperature and the quantity of heat at the high-temperature peak which adopt in the determination of the relationship between the quantity of heat at the high-temperature peak and the foaming temperature).

Each of the thus-obtained foamed particle samples was dried for 24 hours in an oven of 60° C. and then pressurized for 24 hours under a pressure of 2 $kg/cm^2$ with air in a closed vessel to apply an internal pressure to the foamed particles. The thus-treated foamed particle sample was filled into a mold of 180×180 cm×50 mm, and heated with 3.5–6.0 $kg/cm^2G$ of steam to mold the foamed particles. After cooling, a molded article was taken out of the mold and dried for 24 hours in an oven of 60° C. to obtain a finished article.

The density, dimensional change under heat and compressive stress of the thus-obtained molded article were determined. Besides, its fusion-bonding property and appearance were evaluated. The results are shown in Table 2.

The tensile modulus and quantity of heat at the high-temperature peak of the molded article, the data of which are not expressly shown in Table 2, were measured. As a result, the molded article showed the same numerical values as the tensile modulus and quantity of heat at the high-temperature peak of its corresponding foamed particle sample even in each of the Examples and Comparative Examples.

The measuring methods of the dimensional change under heat and compressive stress, and the evaluation methods of the fusion-bonding property and appearance are as follows.

[Measuring Method of Dimensional Change under Heat]

A test piece cut out of each of the molded articles thus obtained into dimensions of 150 mm long×150 mm wide×50 mm high was used to measure a dimensional change under heat along surface of the test piece in accordance with JIS K 6767 except that a measuring temperature was controlled to 120° C.±2° C. For example, in the case of Example 1, a dimensional change under heat was −0.6%. This means that the shrinkage factor of the molded article is 0.6%.

[Measuring Method of Compressive Stress]

A test piece cut out of each of the molded articles thus obtained into dimensions of 50 mm long×50 mm wide×100 mm high was used to measure a stress at 50% compression in accordance with JIS Z 0234, Method A. In this test, a compression rate was controlled to 10 mm/min.

[Evaluation Standard of Fusion-Bonding Property]

A test piece cut out of each of the molded articles thus obtained into dimensions of 10 mm thick×30 mm wide×160 mm long was stretched in a longitudinal direction at a rate of 500 mm/min by a tensile tester to break it, and its rupture cross-section was observed to rank the fusion-bonding bonding property of the sample in accordance with the following standard:

○: Non-interparticle breakage occurred in at least 60% of the rupture cross-section; and x: Non-interparticle breakage occurred in lower than 60% of the rupture cross-section.

[Evaluation Standard of Appearance]

The appearance of each of the molded articles thus obtained was observed to rank the appearance in accordance with the following standard:

○: Voids were scarcely observed in the surface of the molded article, and the molded article underwent no shrinkage;

x: Many voids were observed in the surface of the molded article, and the molded article underwent shrinkage.

INDUSTRIAL APPLICABILITY

The foamed particles of a polypropylene homopolymer according to the present invention have excellent moldability and are useful as molding materials for obtaining molded articles of foamed particles having high stiffness.

The molded articles of the foamed particles composed of the polypropylene homopolymer according to the present invention have high stiffness, are light in weight and can be used in many application fields such as energy absorbers and packing materials.

TABLE 1

| | | Base resin | | | | | |
|---|---|---|---|---|---|---|---|
| | Kind of polymer | Tensile modulus (kg/cm$^2$) | Melting point (°C.) | Total quantity of heat at endothermic peaks (J/g) | MI (g/10 min) | Heating and holding temp. (°C.) | Foaming temp. (°C.) |
| Ex. 1 | Propylene homopolymer | 18,500 | 162.8 | 111.4 | 13.5 | 165.8 | 170.8 |
| Ex. 2 | " | " | " | " | " | " | " |
| Ex. 3 | " | " | " | " | " | " | " |
| Ex. 4 | " | 17,000 | 161.2 | 105.9 | 8.2 | 164.2 | 169.2 |
| Ex. 5 | " | 17,500 | 162.9 | 108.4 | 11.4 | 165.9 | 170.9 |
| Ex. 6 | " | 20,000 | 165.1 | 118.6 | 13.2 | 168.1 | 173.1 |
| Comp. Ex. 1 | Propylene homopolymer | 18,500 | 162.8 | 111.4 | 13.5 | 165.8 | 170.8 |
| Comp. Ex. 2 | " | " | " | " | " | " | " |
| Comp. Ex. 3 | " | 14,200 | 158.0 | 99.0 | 10.8 | 161.0 | 166.0 |
| Comp. Ex. 4 | " | 26,000 | 168.1 | 122.4 | 13.0 | 171.1 | 176.1 |
| Comp. Ex. 5 | Ethylene-propylene random copolymer | 12,000 | 146.0 | 87.0 | 10.0 | 149.0 | 154.1 |
| Comp. Ex. 6 | Ethylene-propylene random copolymer | " | " | " | " | " | " |

TABLE 2

| | Foamed particles | | | Molded article | | | | |
|---|---|---|---|---|---|---|---|---|
| | Tensile modulus (kg/cm$^2$) | Quantity of heat at high-temp. peak (J/g) | ΔE (J/g · °C.) | Density (g/cm$^3$) | Dimensional change under heat (%) | Compressive stress (kg/cm$^2$) | Fusion-bonding property | Appearance |
| Ex. 1 | 18,500 | 34.9 | 12 | 0.060 | −0.6 | 7.7 | ○ | ○ |
| Ex. 2 | " | 54.4 | " | 0.060 | −0.3 | 8.1 | ○ | ○ |
| Ex. 3 | " | 41.7 | " | 0.058 | −0.4 | 7.7 | ○ | ○ |
| Ex. 4 | 17,000 | 34.7 | 10 | 0.063 | −0.4 | 7.8 | ○ | ○ |
| Ex. 5 | 17,500 | 32.5 | 9 | 0.061 | −0.4 | 7.5 | ○ | ○ |
| Ex. 6 | 20,000 | 31.3 | 15 | 0.060 | −0.3 | 7.6 | ○ | ○ |

TABLE 2-continued

| | Foamed particles | | | Molded article | | | | |
|---|---|---|---|---|---|---|---|---|
| | Tensile modulus (kg/cm²) | Quantity of heat at high-temp. peak (J/g) | ΔE (J/g · °C.) | Density (g/cm³) | Dimensional change under heat (%) | Compressive stress (kg/cm²) | Fusion-bonding property | Appearance |
| Comp. Ex. 1 | 18,500 | 17.7 | 12 | 0.060 | −1.2 | 6.0 | ○ | x |
| Comp. Ex. 2 | " | 65.2 | " | 0.062 | −0.4 | Unmeasure-able | x | x |
| Comp. Ex. 3 | 14,200 | 33.4 | 10 | 0.060 | −1.3 | 6.8 | ○ | ○ |
| Comp. Ex. 4 | 26,000 | 30.3 | 22 | Unable to obtain any molded article | | | | |
| Comp. Ex. 5 | 12,000 | 19.5 | — | 0.060 | −1.7 | 5.7 | ○ | ○ |
| Comp. Ex. 6 | " | 34.6 | — | 0.058 | −1.5 | Unmeasure-able | x | x |

We claim:

1. Foamed particles comprising a polypropylene homopolymer as a base resin and having a tensile modulus of 15,000–25,000 kg/cm² and a crystal structure that an inherent peak and a high-temperature peak appear as endothermic peaks on a DSC curve obtained by differential scanning calorimetry of the foamed particles (said high-temperature peak means a peak which appears on the temperature side higher than a temperature corresponding to the inherent peak of endothermic peaks appearing on the DSC curve obtained by heating 2–4 mg of the foamed particles to 220° C. at a heating rate of 10° C./min by a differential scanning calorimeter), characterized in that a quantity of heat at said high-temperature peak is 30–60 J/g.

2. The foamed particles of the polypropylene homopolymer according to claim 1, wherein the tensile modulus is 15,500–20,000 kg/cm².

3. The foamed particles of the polypropylene homopolymer according to claim 1, wherein the quantity of heat at the high-temperature peak is 30–50 J/g.

4. The foamed particles of the polypropylene homopolymer according to claim 1, wherein a total quantity of heat at endothermic peaks appearing on a DSC curve obtained by differential scanning calorimetry of the base resin composed of the polypropylene homopolymer is 120 J/g or less.

5. The foamed particles of the polypropylene homopolymer according to claim 4, wherein the total quantity of heat at the endothermic peaks is 115 J/g or less.

6. The foamed particles of the polypropylene homopolymer according to claim 1, wherein a melt flow index (MI) of the base resin composed of the polypropylene homopolymer is 5–12 g/10 min.

7. A molded article of foamed particles, which is obtained by using foamed particles comprising a polypropylene homopolymer as a base resin and molding them, and has a density of 0.01–0.3 g/cm³, a tensile modulus of 15,000–25,000 kg/cm² and a crystal structure that an inherent peak and a high-temperature peak appear as endothermic peaks on a DSC curve obtained by differential scanning calorimetry of the molded article (said high-temperature peak means a peak which appears on the temperature side higher than a temperature corresponding to the inherent peak of endothermic peaks appearing on the DSC curve obtained by heating 2–4 mg of the molded article to 220° C. at a heating rate of 10° C./min by a differential scanning calorimeter), characterized in that a quantity of heat at said high-temperature peak is 30–60 J/g.

8. The molded article of the foamed particles of the polypropylene homopolymer according to claim 7, wherein a shrinkage factor of the molded article of the foamed particles is 1.0% or lower as determined by measurement of dimensional change under heat under conditions of 120° C. in accordance with JIS K 6767.

* * * * *